United States Patent

Yoo

[11] Patent Number: 5,971,884
[45] Date of Patent: Oct. 26, 1999

[54] POWER CHANGING APPARATUS OF BICYCLE HUB

[75] Inventor: Moon-Soo Yoo, Chungcheongbuk-do, Rep. of Korea

[73] Assignee: World Industry Co., Ltd., Chungcheongbuk-do, Rep. of Korea

[21] Appl. No.: 08/894,822

[22] PCT Filed: Dec. 30, 1996

[86] PCT No.: PCT/KR96/00262

§ 371 Date: Aug. 29, 1997

§ 102(e) Date: Aug. 29, 1997

[87] PCT Pub. No.: WO97/24252

PCT Pub. Date: Jul. 10, 1997

[30] Foreign Application Priority Data

Dec. 30, 1995 [KR] Rep. of Korea .................. 95-69076

[51] Int. Cl.[6] .................................................. B62M 11/16
[52] U.S. Cl. .................... 475/298; 475/297; 74/594.2
[58] Field of Search .................................. 475/298, 299, 475/300, 297; 74/594.2

[56] References Cited

U.S. PATENT DOCUMENTS

| | | | |
|---|---|---|---|
| 5,273,500 | 12/1993 | Nagano | 475/297 X |
| 5,322,487 | 6/1994 | Nagano | 475/297 |
| 5,399,128 | 3/1995 | Nurnberger | 475/298 |
| 5,435,583 | 7/1995 | Foster, Jr. | 74/594.2 X |
| 5,454,766 | 10/1995 | Mills | 74/594.2 X |
| 5,527,230 | 6/1996 | Meier-Burkamp | 475/298 X |
| 5,562,563 | 10/1996 | Shoge | 475/298 |
| 5,785,625 | 7/1998 | Matsuo et al. | 475/297 |

FOREIGN PATENT DOCUMENTS

| | | |
|---|---|---|
| 0 687 622 | 12/1995 | European Pat. Off. . |
| 95/21 090 | 8/1995 | WIPO . |

*Primary Examiner*—Dirk Wright
*Assistant Examiner*—Peter T. Kwon
*Attorney, Agent, or Firm*—Lowe Hauptman Gopstein Gilman & Berner

[57] ABSTRACT

A power changing apparatus of a bicycle hub is provided. The apparatus including a transmission section at one side of a hub shell of a rear wheel, a bi-directional pedaling apparatus (BDPA) section at the other side thereof, and a clutch between the transmission section and the BDPA section provides the power in one direction at all times regardless of the direction of power applied thereto and changes speed according to the driving state of the bicycle. Also, a lever is inserted into the left side of a hub shaft having holes at both ends thereof to control the transmission section and a pin lever is inserted into the right side of the hub shaft to control the BDPA section. The power changing apparatus of the bicycle hub can be connected to a general bicycle compatible with it.

12 Claims, 10 Drawing Sheets

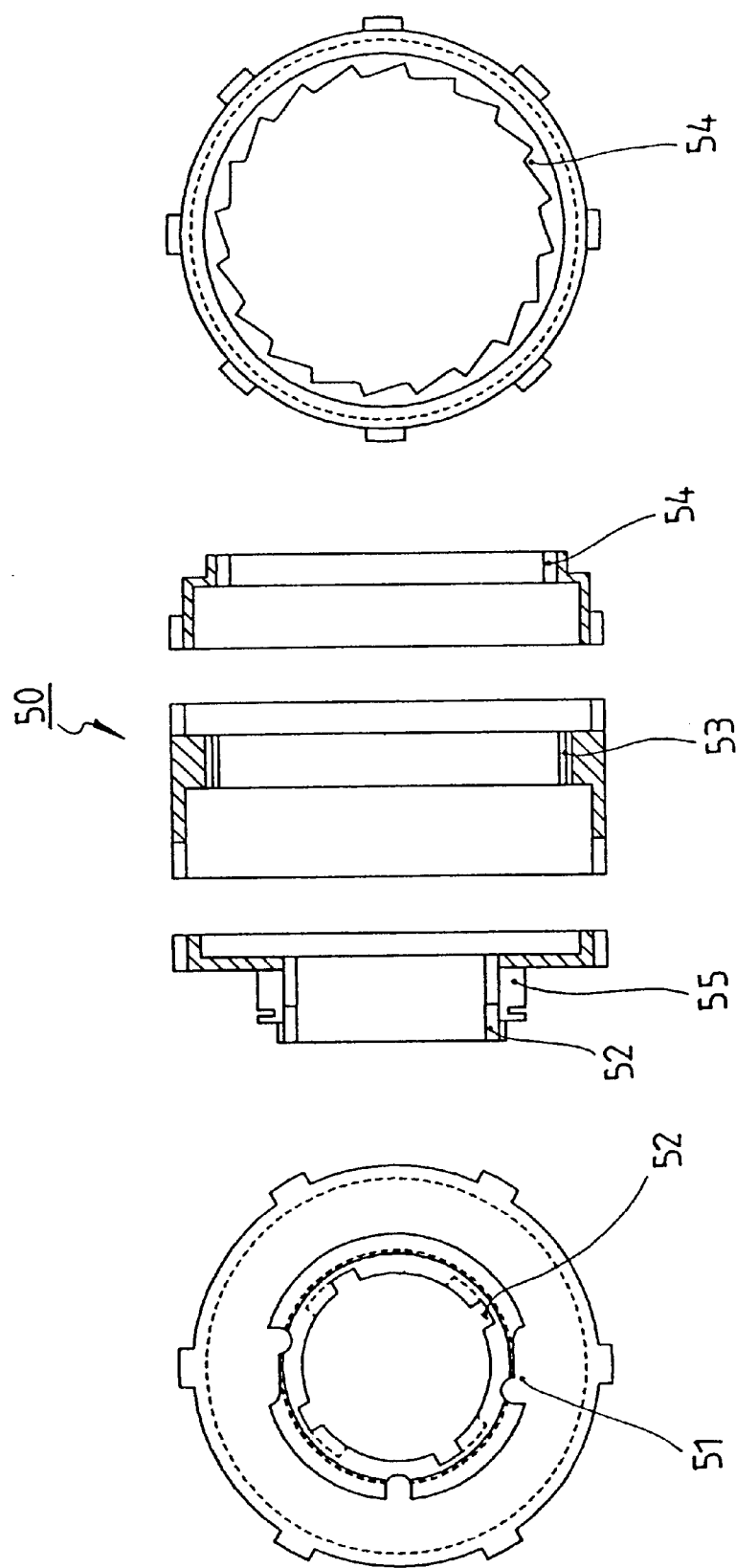

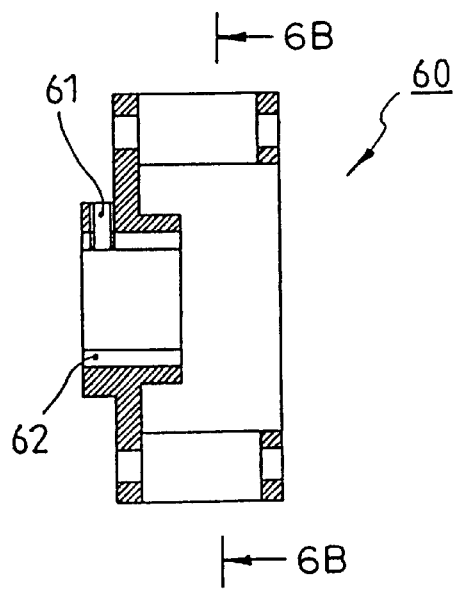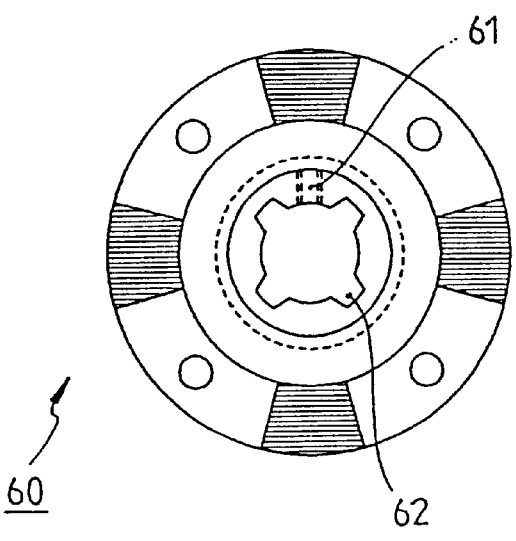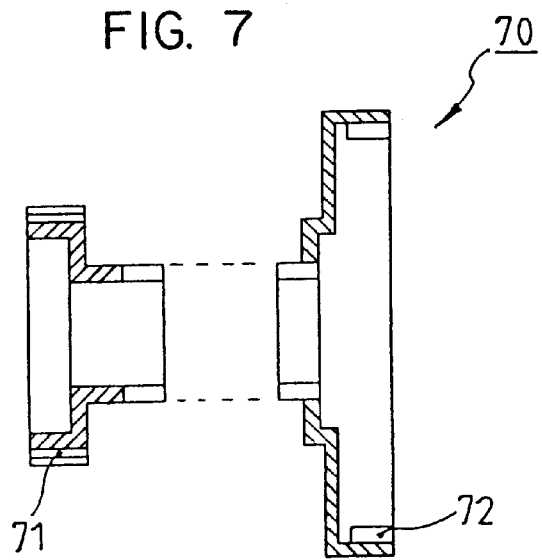

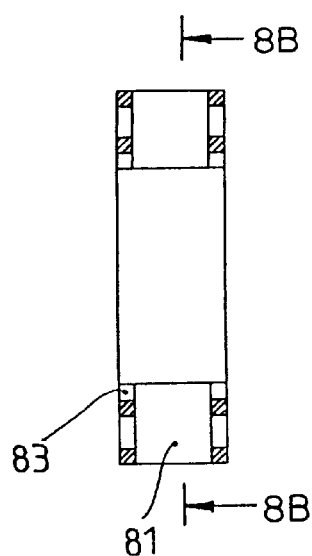
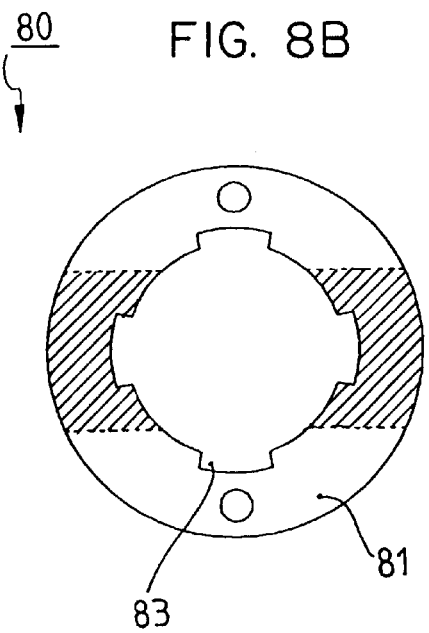
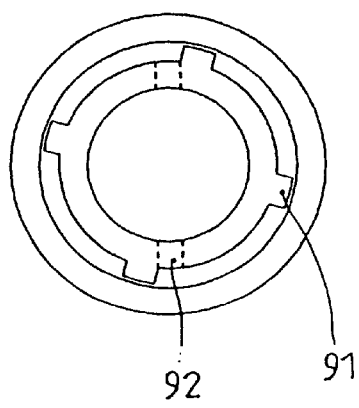
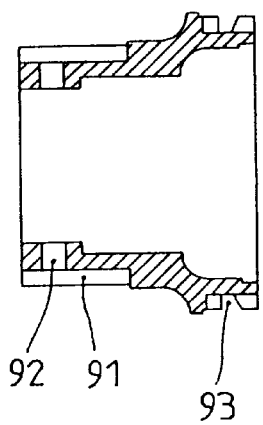
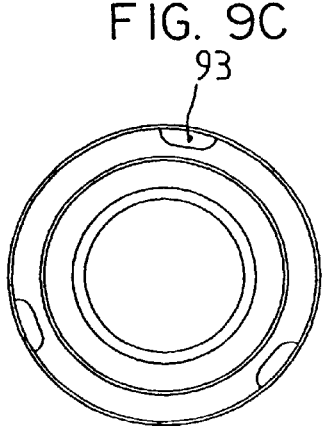

POWER CHANGING APPARATUS OF BICYCLE HUB

TECHNICAL FIELD

The present invention relates to a power changing apparatus which is installed in a rear hub of a bicycle, and more particularly, to a power changing apparatus having a transmission at one side, a bi-directional pedaling device at the other end and a clutch therebetween, which outputs the power only one direction regardless of the direction of applied power and simultaneously change rotation speed of the bicycle in accordance to the traveling state of the bicycle to drive a rear wheel of the bicycle.

BACKGROUND ART

Generally, a bicycle is classified into three: a general bicycle as transport means, a mountain bicycle exclusively used for a mountain exercise and cycles used for a sporting event. Basically, the above all bicycles include front and rear wheels before and after a bicycle frame and a pair of pedals as a power supply source between two wheels. The driving force for bicycle is obtained through pedaling and then the force is transmitted to the rear wheel via a driving sprocket, a chain and a driven sprocket in sequence. However, most of bicycles can travel forward only when pedaling forward. That is, the bicycle cannot travel forward when pedaling rearward. This kind of one-directional bicycle causes easily fatigue in rider's leg and uneven development in a leg muscle when the rider bicycles for many hours.

Thus, in order to solve the problems, many inventors have made an effort in the development of a bi-directional pedaling apparatus which can be applied to a conventional one-directional bicycle. The bi-directional pedaling apparatus developed until now, which allows the bicycle to travel forward both when pedaling forward and rearward, may be classified into three roughly according to methods adopted therefor. That is, there are methods using an auxiliary gear, a bevel gear and a planetary gear. Here, the bi-directional pedaling apparatus is referred to a device in which a bicycle can travel forward at all times when pedaling the bicycle forward or rearward, and an idling is also allowed by selectively controlling a lever if required when pedaling the bicycle rearward, like a conventional bicycle.

As a representative invention related to the bi-directional pedaling apparatus. Manrzoursos et al. (EPO Publication No. 0.369,925) discloses a bi-directional pedaling apparatus adopting the auxiliary gear, Foster (U.S. Pat. No. 5,435,583) discloses a bi-directional pedaling apparatus adopting the bevel gear and a clutch. and the present applicant (Application No. PCT/KR 96/00236) discloses a bi-directional pedaling apparatus adopting the planetary gear.

The above inventions have a mid gear (auxiliary gear, bevel gear and planetary gear) in common in order to change the direction of power, however, also have difference in a method for changing the power direction, distribution degree of load applied to each part during the change of power, preciseness of parts and compatibility with a conventional bicycle. However, all of the inventions are developed to be attachable to a pedal shaft, not to a shaft of the rear wheel.

Particularly, the bi-directional pedaling apparatus (Application No. PCT/KR 96/00236) invented by the present applicant has many advantages in the aspects of preciseness of parts, smoothness in the change of power, compatibility to be directly attachable to a pedal shaft of the conventional bicycle. However, the shapes of the driving sprocket and a crank portion are different from those of the conventional bicycle, so that these parts should be changed by new ones when attaching the apparatus to the conventional bicycle.

Also, since the bi-directional pedaling apparatus invented by the present applicant is attached to the outside of the pedal shaft like the above-described apparatuses, the attached apparatus is protruded toward the outside of the bicycle frame. The protruded apparatus may obstruct the pedaling by a rider. In addition, it is difficult to attach the bi-directional pedaling apparatus protruded toward the outside of the bicycle frame to a newly developed bicycle which can be folded for portable transportation.

Thus, the above problems have raised requirements in development of a new bi-directional pedaling apparatus which can be attached to a shaft of the rear wheel.

On the other hand, in order to reduce fatigue in legs during pedaling and effectively utilize energy applied to the pedals, a pedaling rhythm and pedaling force applied to the pedals should be constant. A transmission for a bicycle is developed for satisfying the above conditions, which controls a gear ratio between a driving sprocket and a driven sprocket, thereby properly applying the pedaling force according to a driving resistance to the driving of bicycle.

As for the transmission, there are an external type and an internal type. The external transmission directly changes the gear ratio while applying a chain on a plurality of sprockets having different diameters in sequence which are installed at a pedal shaft and a hub shaft, and the internal transmission changes the gear ratio by installing planetary gears in a body of the rear hub. The internal transmission can be much miniaturized compared with the external transmission and protected from external impact while blocking the influx of dust or foreign substance since the internal transmission is installed in the hub shell. Due to these advantages, the internal transmission is widely adopted for the general bicycle. Here, Japanese Laid-open Patent Publication No. Heisei 5-65094 (dated Mar. 3, 1993) may be referred as an example of the inventions related to the internal transmission.

There are further inventions related to the internal transmission installed in the rear hub, which are for increasing efficiency of the transmission itself or controlling the gear ratio. However, an internal transmission including a bi-directional pedaling device for changing the power direction is unknown.

As described above, most of bi-directional pedaling devices have been installed to the pedal shaft, not to a hub shaft of the rear wheel. Also, most inventions related to the hub shaft is limited to only the transmission and it is difficult to find a multipurpose bicycle including both the transmission and the bi-directional pedaling device.

Thus, requirements for a multipurpose apparatus of a bicycle in which the bi-directional pedaling device for balanced development of muscle in human legs and the transmission for effectively utilizing energy applied to the pedal, and simultaneously a bicycle which has high safety and convenience in handling by installing all parts therein have been increased.

DISCLOSURE OF THE INVENTION

It is an object of the present invention to provide a multipurpose attachment apparatus related to a bicycle, which can optimize driving efficiency and evenly develop muscle in human legs during the driving of the bicycle.

The characteristic of the present invention is that a bi-directional pedaling apparatus and an improved transmission are both installed to a hub shaft of a rear wheel. Accordingly, the bi-directional pedaling apparatus can develop the muscle in rider's legs in balance and the transmission can optimize efficiency in exercise of the rider.

The basic structure of a power change apparatus of a bicycle hub according to the present invention is as follows. First, a transmission section is installed at one end of a hub shaft and a bi-directional pedaling apparatus (BDPA) section is installed at the other end thereof, and a clutch is installed at the middle portion. Then, the sub-assembly of the above three parts is inserted into a hub shell and then both ends of the hub shell are closed by a cover at one end and a driven sprocket at the other end thereof.

The transmission section of the power changing apparatus includes one sun gear, one carrier and one ring gear. The transmission section having the above structure receives power from the clutch or the BDPA section which will be described later. The power applied to the transmission section is transmitted to the hub shell via various paths. The rear wheel of the bicycle travels at low, middle or high speed according to the power transmission paths.

Also, the clutch of the present invention has a hollow cylindrical shape, having the spline having a plurality of slant tongues at one end of the out side and protrusions at the other end thereof. The clutch having the above structure is detachably coupled to the carrier at one side toward the transmission section and connected to the ring gear at the other side toward the BDPA section. The location of the clutch can be shifted in the left and right by a level installed in the hub shaft. The clutch does not transmit the power to the transmission section at all (low speed and middle speed), or transmit the power to the carrier of the transmission section (high speed), by shifting the location thereof.

Also, the BDPA section of the present invention includes one ring gear, one ratchet wheel and two carriers. The BDPA section having the structure receives the power from a drive wheel which will be described later and transmits the received power to the clutch and the transmission section. The BDPA section applies the power in clockwise (based on the view from the right with respect to the traveling direction of a bicycle) at all times regardless of the direction of the power transmitted from the drive wheel. Thus, the constituent parts (clutch, transmission section and hub shell to be described) which locate to be receivable the power from the bi-pedaling apparatus section rotate only in clockwise.

On the other hand, a hub shell having a cylindrical shape with multiple steps acts as a housing for receiving the constituent parts of the present invention. Two ratchets are formed at the inner wall of the hub shell to receive the power from the transmission section. Also, flanges are formed at both ends of the outside thereof to couple with spokes of the rear wheel.

Also, a drive wheel of the present invention is rotatably coupled to the hub shaft while being integrally connected to a driven sprocket. Thus, the drive wheel receives the power generated from the pedals via the driven sprocket and transmits the received power to the BDPA section. Also, a pin lever is inserted into the hub shaft to control the BDPA section.

To sum up the above description, the power changing apparatus of the bicycle according to the present invention includes the transmission section, the clutch, the BDPA section, the hub shell, the cover and the driven sprocket which are connected in sequence. The apparatus of the present invention can be attached to a rear fork tip of the frame of a conventional bicycle by coupling the flanges of the hub shell to the spoke, thereby being connected to the rear wheel of the bicycle.

The power transmission paths of the power changing apparatus according to the present invention will be described briefly. First, the power generated from the pedals is transmitted to the driven sprocket via a crank, a driving sprocket and a chain in sequence. The driven sprocket provides the power to the apparatus of the present invention while rotating together with the drive wheel and transmits the power to the BDPA section regardless of the rotation direction thereof. The BDPA section transmits the received power to the clutch and the transmission section and the transmission section provides the transmitted power to the hub shell in the end. Accordingly, the power provided to the hub shell drives the rear wheel of the bicycle.

As described above, in the power changing apparatus of a bicycle according to the present invention, the BDPA section which was installed at the pedal shaft being protruded therefrom in the prior art is installed in the hub shell of the rear wheel, so that the forward driving by reverse pedaling is possible without inconvenience in pedaling, and simultaneously the transmission section is installed in the hub shell together with the BDPA section to effectively utilize energy required for driving the bicycle. Also, the power changing apparatus of the bicycle can be easily attached to the rear wheel of the conventional bicycle, thereby improving compatibility with the parts of the conventional bicycle.

BRIEF DESCRIPTION OF THE DRAWINGS

FIGS. 5A, 5B and 5C are a left side view, exploded front sectional view and right side view of a second ring gear of a bi-directional pedaling apparatus (BDPA) section of the power changing apparatus according to the present invention, respectively;

FIGS. 6A and 6B are front sectional view and sectional view cut along line $\alpha$—$\alpha$ of FIG. 6A of a second carrier of the BDPA section of the power changing apparatus according to the present invention, respectively;

FIG. 7 is an exploded front sectional view of a ratchet wheel of the BDPA section of the power changing apparatus according to the present invention. respectively:

FIGS. 8A and 8B are front sectional view and sectional view cut along line $\alpha$—$\alpha$ of FIG. 8A of a third carrier of the BDPA section of the power changing apparatus according to the present invention, respectively;

FIGS. 9A, 9B and 9C are a left side view, front sectional view and right side view of a drive wheel of the power changing apparatus according to the present invention, respectively;

BEST MODE FOR CARRYING OUT THE INVENTION

Figure 1:
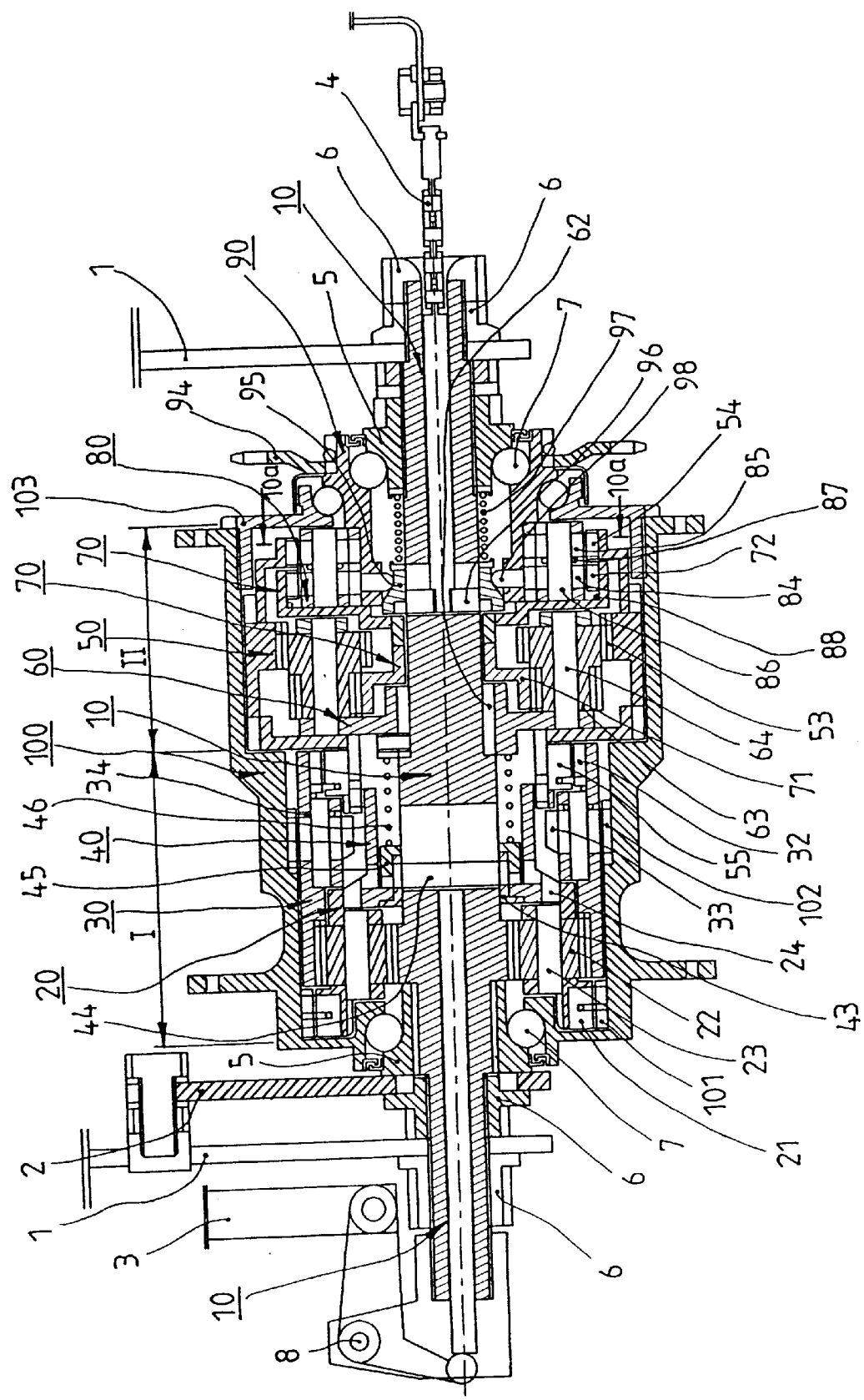
FIG. 1 is a sectional view of a power changing apparatus of a bicycle hub according to the present invention.
Figure 2:
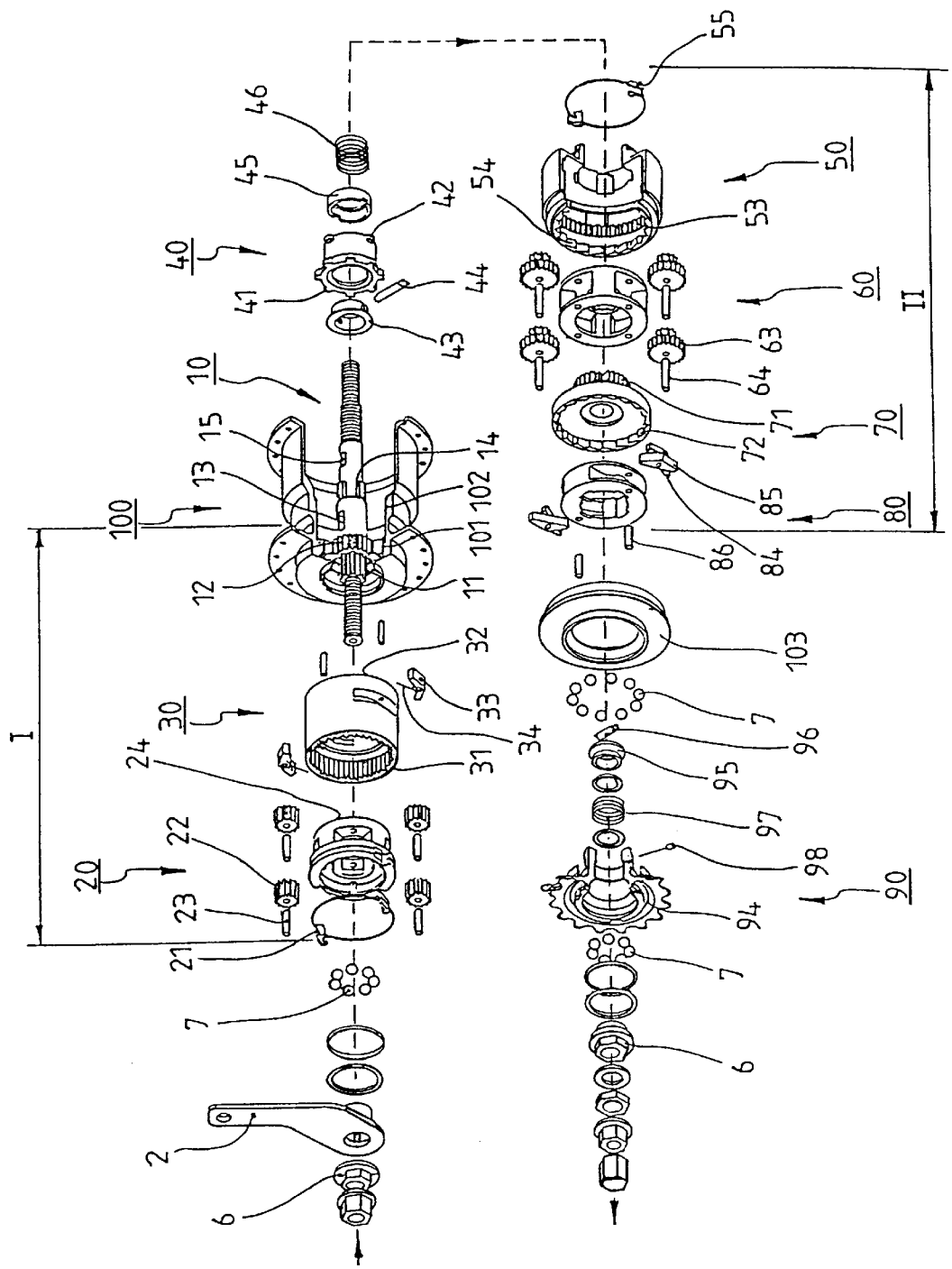
FIG. 2 is an exploded perspective view of the power changing apparatus of the bicycle hub shown in FIG. 1.
Figure 3A:
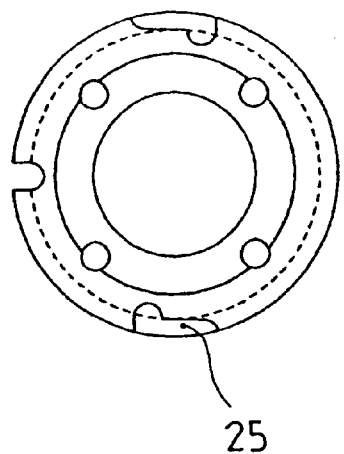
FIGS. 3A, 3B and 3C are a left side view, front sectional view and right side view of a first carrier of a transmission section of the power changing apparatus according to the present invention, respectively.
Figure 3B:
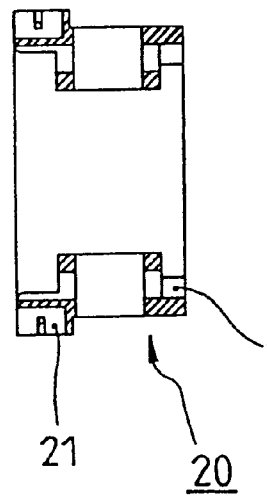
Figure 3C:
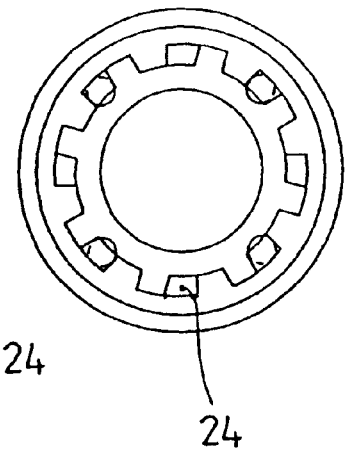
Figure 4A:
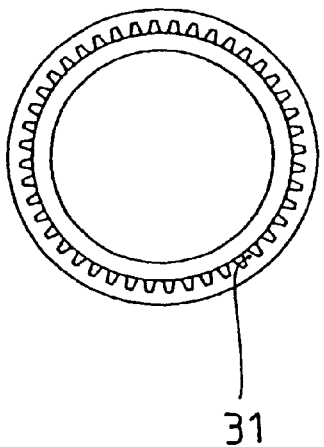
FIGS. 4A, 4B and 4C are a left side view, front sectional view and right side view of a first ring gear of the transmission section of the power changing apparatus according to the present invention, respectively.
Figure 4B:
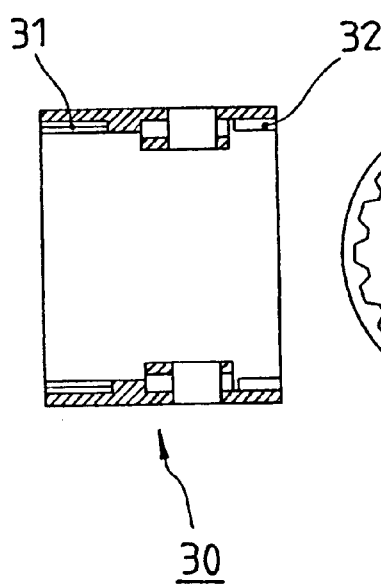
Figure 4C:
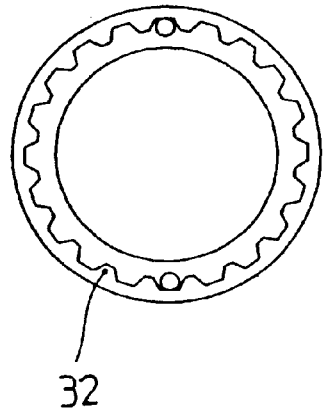

Referring to FIGS. 1 and 2, a power chancing apparatus of the present invention will be described roughly.

In the power changing apparatus of the present invention, a transmission section I, a clutch 40 and a bi-directional pedaling apparatus (BDPA) section II are installed at the left, middle and right portions in FIGS. 1 and 2, respectively, centering a hub shaft 10. Also, a sub-assembly including the transmission section I, the clutch 40 and the BDPA section II is enclosed by a hub shell. A supporting bar 2 and a driven sprocket 94 connected to a drive wheel 90 are connected to the left and right ends of the power changing apparatus, respectively.

The left and right portions of the hub shaft 10 have a hollow cylindrical shape, wherein a lever 3 and a pin lever 4 are inserted into the left and right portions, respectively. Here, the lever 3 controls the clutch 40 and the pin lever 4 controls a third carrier 80 of the BDPA section II. Also, the left and right portions of the hub shaft 10 have a screw-outer surface which is connected to a bicycle frame when attaching the power changing apparatus to a conventional bicycle. Here, the supporting bar 2 is used as auxiliary means for tightly connecting the power changing apparatus of the present invention to the bicycle frame.

Hereinafter, the power changing apparatus of the present invention will be described in detail with reference to the related drawings.

As described above, the power changing apparatus of the present invention basically includes the transmission section I, the clutch 40 and the BPDA section II. Also, these three parts are coupled centering the hub shaft 10 and enclosed by the hub shell 100 to form a sub-assembly. Then, both sides of the sub-assembly are closed by covers 5 and 103 to form a final unit. Thus, the present invention will be described in detail in the order of the hub shaft 10 around which all parts are coupled, major constituents including the transmission section I, the clutch 40 and the BDPA section II, and other constituent parts.

Prior to the detailed description, we make clear the followings. That is, since the power changing apparatus of the present invention is related to a rotary motion, major parts of the apparatus have a circular, cylindrical or hollow cylindrical shape. Also, all ratchets adopted in the power changing apparatus, exclusive of a fourth ratchet 72 which is a reverse directional ratchet, are forward directional ratchets.

First, the hub shaft 10 of the power changing apparatus according to the present invention will be described with reference to FIGS. 1 and 2. The hub shaft 10 has a hollow shaft with multiple steps as shown in FIG. 2. In the outer side of the hub shaft 10, a screw-portion, a first spline 11, a first sun gear 12, a first pin hole 13, a second spline 14 and a second pin hole 15 and another screw-portion are formed from the left to the right thereof. Also, in the inner side of the hub shaft 10, a cylindrical hole is formed at the left and right portions, that is, the cylindrical hole does not go through the hub shaft 10. The constituent parts of the power changing apparatus which will be described later, are assembled to the hub shaft 10 having the above shape in sequence.

The transmission section I as one of major constituents of the power changing apparatus will be described with reference to FIGS. 1 through 4C. The transmission section I includes the first sun gear 12, a first carrier 20 and a first ring gear 30 which will be described in sequence.

The first sun gear 12 of the transmission section I is integrally formed at the left portion of the hub shaft 10 without being rotated.

The first carrier 20 of the transmission section I has a hollow cylindrical shape as shown in FIGS. 1, 2 and 3A to 3C. Two openings 25 are formed at the outer circumference of the left side of the first carrier 20 and four holes are formed at the circumference, and third spline grooves 24 are formed at the inner portion of the right side. First pawls 21 are installed in the openings 25 formed along the outer circumference of the left side. Also, a plurality of planetary gears 22 are installed in the holes formed at the circumference of the first carrier 20 centering each corresponding planetary gear shaft 23 to be rotatable in the same direction as the axial direction of the first carrier 20.

In the first carrier 20 having the above shape, the first pawls 21 of the first carrier 20 are engaged with a first ratchet 101 of the hub shell 100 which will be described later, the inner side of the planetary gears 22 are engaged with the first sun gear 12, and the third spline grooves 24 of the first carrier 20 are engaged with third splines 41 of the clutch 40 which will be described later.

The first ring gear 30 of the transmission section I has a hollow cylindrical shaped as shown in FIGS. 1, 2 and 4A to 4C. A first gear 31 is formed at the inner wall of the left side and two holes are formed at the circumference thereof, and a third ratchet 32 is formed at the inner wall of the right side. Second pawls 33 are elastically installed in the holes of the first ring gear 30 by a spring 34. Here, the second pawls 33 are shaped like a boomerang and the center of the second pawls 33 is installed parallel to an axis of the first ring gear 30.

In the first ring gear 30 having the above shape, the first gear 31 is engaged with the outer side of the planetary gear 22, and the outer side of the second pawls 33 is engaged with a second ratchet 102 of the hub shell 100 and the inner side thereof is engaged with protrusions 42 of the clutch 40, and the third ratchet 32 is engaged with third pawls 55 of a second ring gear 50 of the BDPA section II which will be described later.

The transmission section I having the above-described structure receives the power from the BDPA section II and then transmits the power to the hub shell 100 after changing the rotation speed into a low, middle or high speed according to the location of the clutch 40 which will be described below.

The clutch 40 of the power changing apparatus according to the present invention has a hollow cylindrical shape as shown in FIGS. 1 and 2. The clutch 40 has the third splines 41 having a plurality of slant tongues at the outer portion of the left side and two holes piercing the circumference thereof, and four protrusions 42 at the outer portion of the right side. In the clutch 40 having the above shape, the third splines 41 are engaged with the third spline grooves 24 of the first carrier 20 of the transmission section I and four protrusions 42 are slidably connected to four slots 52 of the second ring gear 50 of the BDPA section II which will be described later.

In order to install the clutch 40 centering the hub shaft 10, auxiliary parts including a fixing ring 43, a clutch key 44, a clutch ring 45, a clutch spring 46, etc. are required. Each shape of the auxiliary parts may be imaginable by understanding the assembling process thereof which will now be described. In the assembling of the clutch 40, the fixing ring 43 having two holes at the circumference thereof is first inserted into the hub shaft 10 to contact with the first pin holes 13, and the clutch 43 is put over the fixing ring 40. Then, the first pin holes 13 of the hub shaft 10, the holes of the fixing ring 43 and the holes of the clutch 40 are matched each other and then the clutch key 44 is inserted through each two holes. Then, the clutch ring 45 having a pair of jaws at the left side thereof is put over the above assembly into which the clutch key 44 is inserted, such that the clutch key 44 is fixed by the jaws of the clutch ring 45. The outer side of this assembled clutch portion is supported by the clutch spring 46 to elastically control the clutch 40. The clutch 40 is controlled by the lever 3. That is, the location of the clutch 40 is shifted to the right when pulling the lever 3, and the clutch 40 returns to the initial location when releasing the state of the lever 3 hold. The clutch 40 transmits the power received from the BDPA section II to the transmission section I while being maintained in the left for the high speed, and not to the transmission section I while being shifted in the right for the middle and low speeds.

The BDPA section II will be described with reference to FIGS. 1, 2 and 5A through 8C. The BDPA section II includes a second ring gear 50, a second carrier 60, a ratchet wheel 70 and a third carrier 80 which will now be described in sequence.

The second ring gear 50 of the BDPA section II is a sub-assembly (see FIG. 2) formed by combining three parts which are manufactured separately as shown in FIG. 5B. The sub-assembly is regarded as one part since each part forming the sub-assembly integrally rotates during the rotary motion.

Two openings 51 are formed at the circumference of the left side and four slots 52 are formed at the inner portion of the left side. Also, a second gear 53 is formed at the inner wall of the middle portion and a fifth ratchet 54 is formed at the inner wall of the right side. Third pawls 55 are installed in the two openings 51 formed at the circumference of the left side.

In the second ring gear 50 having the above shape, the third pawls 55 are engaged with the third ratchet 32 of the first ring gear 30 and four slots 52 are slidably connected to four protrusions 42 of the clutch 40, respectively. Also, the second gear 53 is engaged with a plurality of two-stepped planetary gears 63 of the second carrier 60 which will be described below, and the fifth ratchet 54 is engaged with fifth pawls 85 of a third carrier 80 which will be described later.

The shape of the second carrier 60 of the BDPA section II is similar to a hollow cylinder as shown in FIGS. 1, 2, 6A and 6B. A nut hole 61 is pierced at the circumference of the left side and second spline grooves 62 are formed at the inner portion of the left side. Also, four holes are pierced at the circumference of the second carrier 60 and the two-stepped planetary gears 63 are rotatably fixed by each corresponding planetary gear shaft 64 in the respective holes. The second carrier 60 having the above shape is connected to the second spline 14 of the hub shaft 10 and a bolt (not shown) is inserted into the nut hole 61 to prevent the second carrier 60 from being slid from the hub shaft 10, so that the second carrier 60 is integrally connected to the hub shaft 10.

As shown in FIG. 2. each small gear of the two-stepped planetary gears 63 is engaged with a second sun gear 71 and each large gear thereof is engaged with the second gear 53 of the second ring gear 50. The second carrier 60 itself does not rotate but changes the direction of power applied in the counterclockwise into the clockwise while only two-stepped planetary gears 63 rotate.

The two-stepped planetary gears 63 are designed to be replaced by another two-stepped planetary gears having different ratio in diameter of the paired gears, so that the BDPA section II including two-stepped planetary gears 63 can serve also as speed change means.

The ratchet wheel 70 of the BDPA section II is a sub-assembly (see FIG. 2) formed by combining two parts which are manufactured separately as shown in FIG. 7. The second sun gear 71 locates at the left side of the ratchet wheel 70 and a fourth ratchet 72 is formed at the inner wall of the right side of the ratchet wheel 70.

The second sun gear 71 of the ratchet wheel 70 is engaged with the two-stepped planetary gears 63 of the second carrier 60 and the fourth ratchet 72 is engaged with fourth pawls 84 of the third carrier 80. The ratchet wheel 70 engaged with the peripheral parts is rotatably fixed around the hub shaft 10 and receives only the counterclockwise power to transmitted the received power to the second carrier 60. Accordingly, the ratchet wheel 70 rotates only counterclockwise.

Lastly, the third carrier 80 of the BDPA section II has a hollow cylindrical shape as shown in FIGS. 1, 2, 8A and 8B.

Two grooves 81 are cut at the circumference of the third carrier 80, and fourth and fifth pawls 84 and 85 are rotatably coupled by a pawl shaft 86 within the grooves 81. Here, the fourth and fifth pawls 84 and 85 have a triangular shaped with cut two ends (see FIG. 10) and are diagonally connected each other by elasticity of a pawl spring 87 (see FIG. 1). Also, four grooves 83 are formed at the inner wall of the third carrier 80 parallel to an axis of the third carrier 80. In the third carrier 80 having the above shape, the fourth pawls 84 are engaged with the fourth ratchet 72 of the ratchet wheel 70 and the fifth pawls 85 are engaged with the fifth ratchet 54 of the second ring sear 50. Also, the grooves 83 formed at the inner wall of the third carrier 80 are put over each tongue 91 of a drive wheel 90. Here, the width of the grooves 83 is wider twice or more than that of the tongue 91 (see FIG. 10). The third carrier 80 connected to the peripheral parts, as a power distributer, transmits the clockwise power received from the drive wheel 90 to the second ring gear 50 using the fifth pawls 85 and the fifth ratchet 52, and the counterclockwise power received from the drive wheel 90 to the ratchet wheel 70 using the fourth pawls 84 and the fourth ratchet 72.

The drive wheel 90 of the power changing apparatus will now be described with reference to FIGS. 1, 2, 9A to 9C. The drive wheel 90 having a hollow cylindrical shape has four tongues 91 at the outer portion of the left side, two holes 92 through which a pin 98 passes are formed at the circumference of the left side, and openings 93 are formed at the circumference of the right side. Here, the driven sprocket 94 is tightly connected to the openings 93.

In the drive wheel 90 having the above shape, the tongues 91 locate beneath the fourth pawls 84 and the fifth pawls 85 of the third carrier 80. Accordingly, the drive wheel 90 selectively transmits the power to the BDPA section II according to the rotation direction of the driven sprocket 94.

On the other hand, as shown in FIGS. 1 and 2, a key holder 95 for holding a second key 96 locates beneath the left side of the drive wheel 90 and the second key 96 being screwed at the middle portion is screw-connected to one end of the pin lever 4. The outer side of the key holder 95 is tapered in the right to control the upward and downward motions of the pin 98 slidably inserted into the holes 92 of the drive wheel 90. That is, when pulling the pin lever 4, the key holder 95 is shifted to the right, raising the pin 98. Meanwhile, the key holder 95 is shifted to the initial location when releasing the hold state of the pin lever 4, thereby returning the pin 98 to the initial location.

For the last time, the hub shell 100 of the power changing apparatus has a hollow cylindrical shape with multiple steps as shown in FIGS. 1 and 2. The first and second ratchets 101 and 102 are formed at the inner walls of the left side and middle portion thereof, respectively. The hub shell 100 drives a rear wheel of a bicycle by receiving the power from the first ring gear 30 (middle or high speed) for protecting the parts used in the power changing apparatus of the present invention. The right end of the hub shell 100 is closed by the cover 103.

In FIGS. 1 and 2, reference numeral 6 represents nuts for tightly connecting the power changing apparatus of the present invention to the hub shaft 10 and reference numeral 7 represents bearings for smoothly rotating the power changing apparatus.

An operational effect of the power changing apparatus according to the present invention, having the above-escribed structure, will be described below.

The power changing apparatus of the present invention controls the rotation direction of power and simultaneously an input-to-output ratio of the power, so that the operational effect of the power changing apparatus will be described by classifying the applied power direction into the clockwise and counterclockwise directions.

First, the case where the power is applied in clockwise will now be described. Here, after describing the process until the power is applied to the BDPA section II, the speed changing processes into the first stage (low speed), second stage (middle speed) and third stage (high speed) will be described in sequence.

Figure 10A:
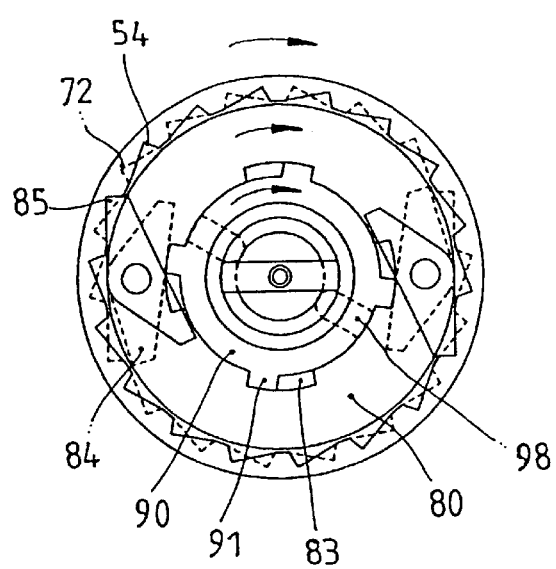
FIGS. 10A, 10B and 10C are sectional view cut alone line $\alpha$—$\alpha$ of FIG. 1 illustrating operational states when the power is applied in clockwise and counterclockwise and idling state, respectively.

First, when the power is applied to the power changing apparatus in clockwise, that is, the driven sprocket 94 rotates in clockwise, the drive wheel 90 integrally formed with the driven sprocket 94 also rotates in clockwise in cooperation with the driven sprocket 94. Here, as shown in FIG. 10A, the tongues 91 of the drive wheel 90 raises the fourth pawls 84 (expressed by a dotted line) of the third carrier 80. As a result, the fourth pawls 84 are released from the fourth ratchet 72 of the ratchet wheel 70 and simultaneously the fifth pawls 85 (expressed by a solid line) of the third carrier 80, which are not raised, is engaged with the fifth ratchet 54 of the second ring gear 50 by the elasticity of the pawl spring 87 (see FIG. 1). Thus, the drive wheel 90, the third carrier 80 and the second ring gear 50 integrally rotate in clockwise.

The power applied in clockwise reaches the second ring gear 50 without change in direction thereof and then is transmitted to the transmission section I to change the rotation speed into the first, second or third stage.

The process in which the rotation speed is chanced into the first stage by the transmission section I will now be described with reference to FIG. 11. As a precondition for obtaining the rotation speed of the first stage, one end of the second pawls 33 of the first ring gear 30 should be raised by the third splines 41 of the clutch 40 by pulling the lever 3 to release the second paws 33 from the second ratchet 102 of the hub shell 100.

Figure 11:
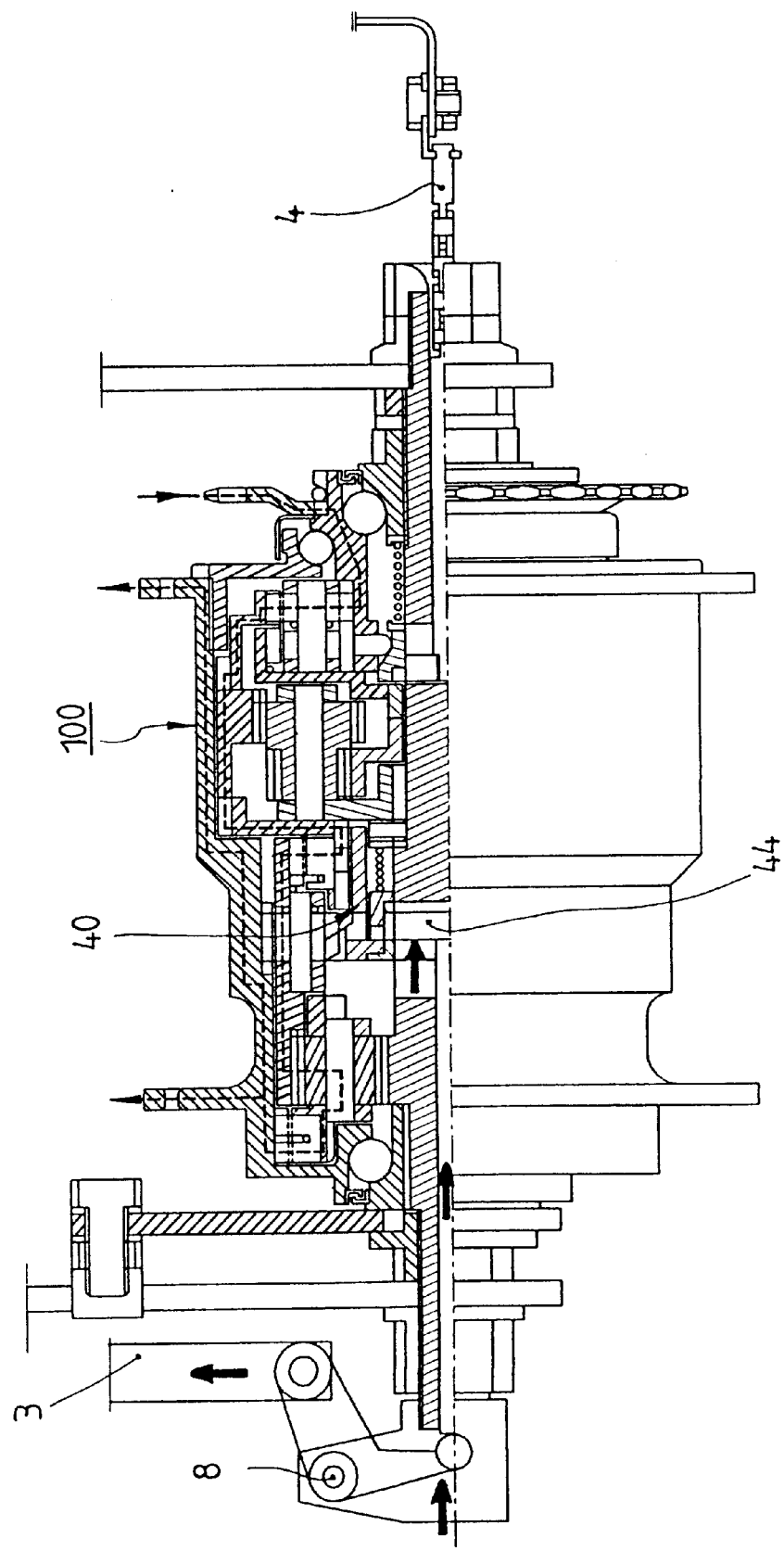
FIG. 11 is a diagram showing the operational state when the speed is changed to the first stage in the power changing apparatus according to the present invention.

Here, the other end of the lever 3 is pushed in right based on the principle of a lever centering the fixing pin 8 installed at the hub shaft 10 when pulling one end of the lever 3, so that the clutch 40 is shifted to the right as shown in FIG. 11. Accordingly, the clutch key 44 contacting the other end of the lever 4, the fixing ring 43 and the clutch ring 45 are pushed in cooperated each other, thereby shifting the clutch 40 to the right.

At the rotation speed of the first stage, the power is transmitted to the second ring gear 50, the first ring gear 30, the first carrier 20 and the hub shell 100 in sequence as shown in FIG. 11. When the power is transmitted from the first ring gear 30 to the planetary gears 22 of the first carrier 20, the rotation speed is reduced. Here, a speed reduction ratio depends on a gear ratio and the principle thereof is the same as a general speed changing means.

The process in which the rotation speed is changed into the second stage by the transmission section I will now be described with reference to FIG. 12. As a precondition for obtaining the rotation speed of the second stage, the third splines 41 of the clutch 40 should be located near the second pawls 33 of the first ring gear 30 by pulling the lever 3 by half. Accordingly, the power applied from the second ring gear 50 is transmitted to only the first ring gear 30, not to the first carrier 20. Meanwhile, since the clutch 40 does not reach the second pawls 33, the second pawls 33 of the first ring gear 30 are engaged with the second ratchet 102 of the hub shell 100.

Figure 12:
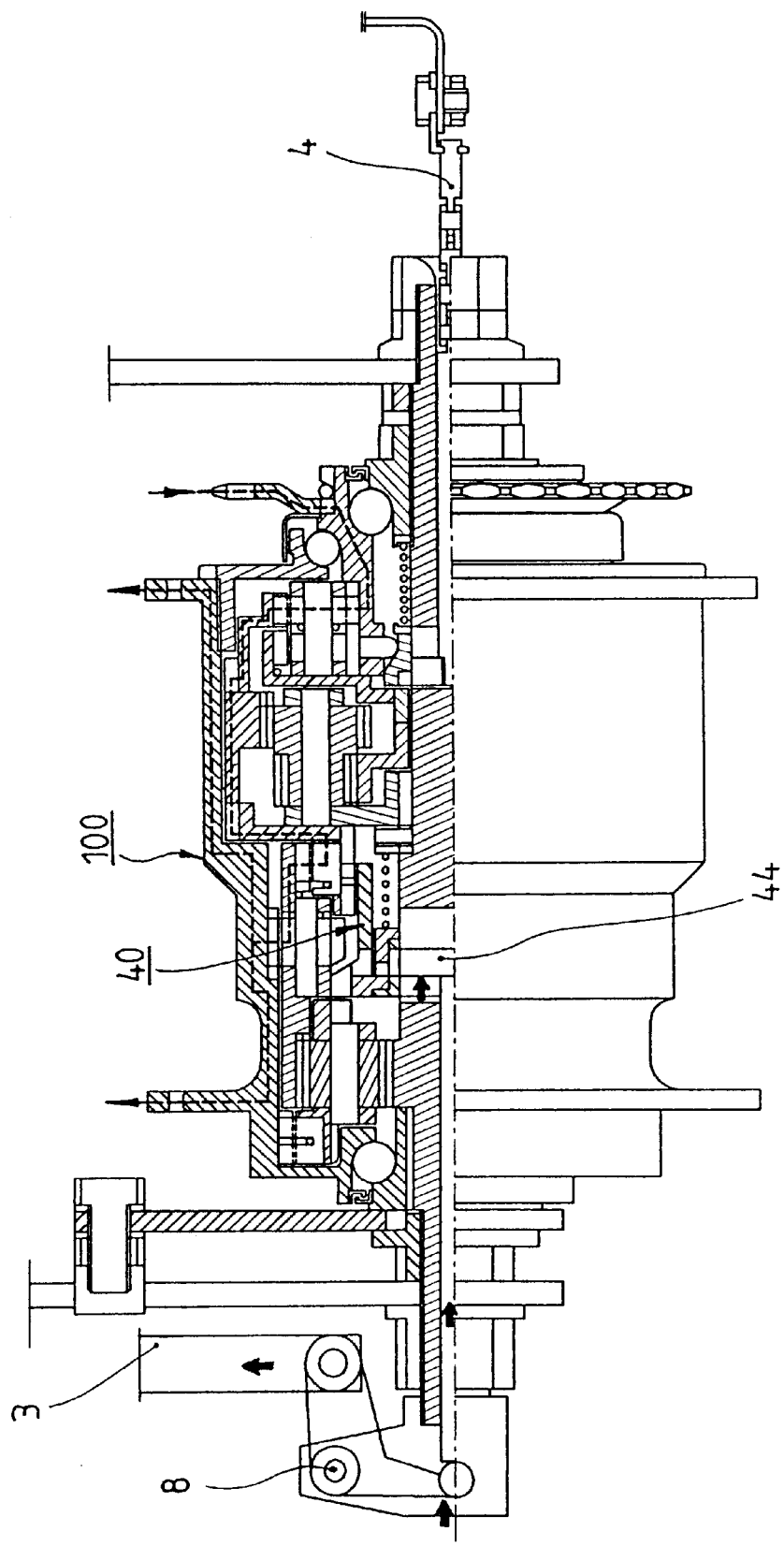
FIG. 12 is a diagram showing the operational state when the speed is changed to the second stage in the power changing apparatus according to the present invention.

At the rotation speed of the second stage, the power is transmitted to the second ring gear 50, the first ring gear 30 and the hub shell 100 in sequence as shown in FIG. 12. When the power is applied from the first ring gear 30 and then transmitted to the hub shell 100, the power apply and transmission speeds are the same each other due to the same gear ratio. Here, even though the first carrier 20 engaged with the first ring gear 30 rotates in cooperated with the first ring gear 30, the power cannot be transmitted to the hub shell 100 since the first carrier 20 rotates at the reduced speed.

The process in which the rotation speed is changed into the third stage by the transmission section I will now be described with reference to FIG. 13. As a precondition for obtaining the rotation speed of the third stage, the third splines 41 of the clutch 40 should be engaged with the third spline grooves 24 of the first carrier 20 while the lever 3 maintains in the initial state without motion.

Figure 13:
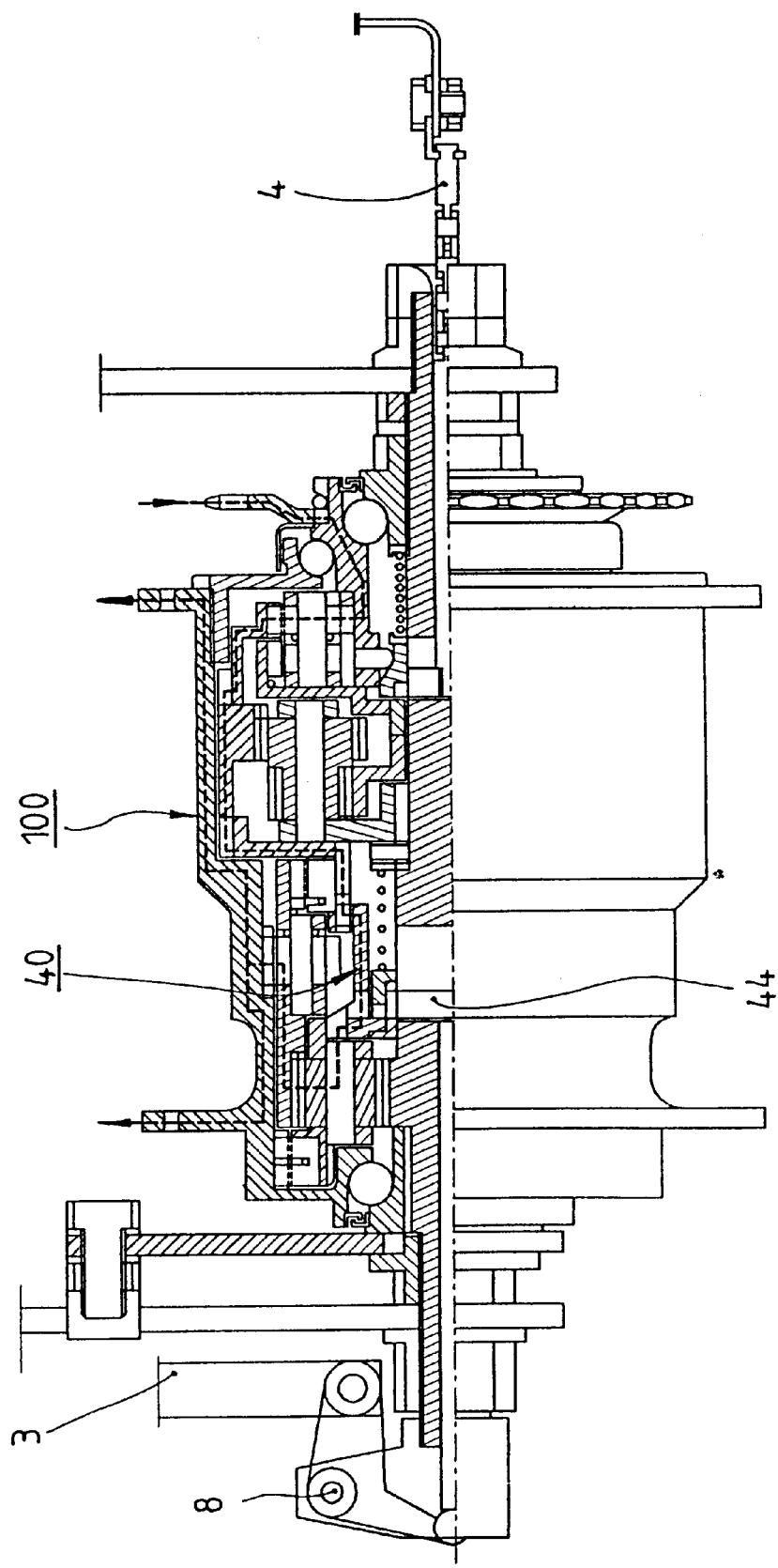
FIG. 13 is a diagram showing the operational state when the speed is changed to the third stage in the power changing apparatus according to the present invention.

At the rotation speed of the third stage, the power is transmitted to the second ring gear 50, the clutch 40, the first carrier 20, the first ring gear 30 and the hub shell 100 in sequence as shown in FIG. 13. The power applied from the second ring gear 50 is directly transmitted to the first carrier 20 via the clutch 40 skipping the first ring gear 30 since the rotation speed is increased when the power is transmitted from the first carrier 20 to the first ring gear 30. That is, since the first ring gear 30 rotates faster than the second ring gear 50, the third pawls 55 are not engaged with the third ratchet 32.

Figure 10B:
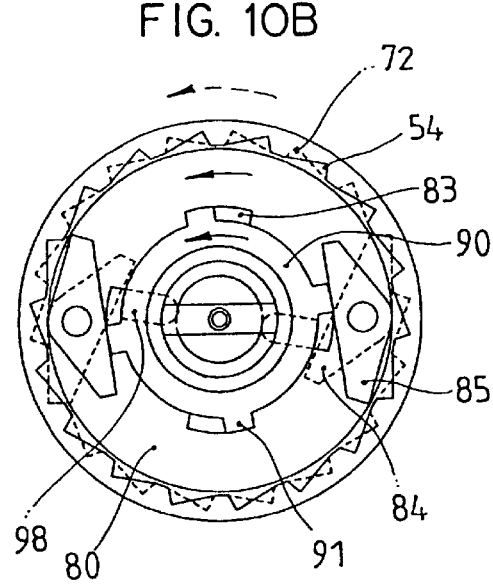

Second, when the power is applied to the power changing apparatus in counterclockwise, the process of transmitting the power to the BDPA section II will now be described. In this case, the driven sprocket 94 rotates in counterclockwise, the drive wheel 90 integrally formed with the driven sprocket 94 also rotates in counterclockwise in cooperation with the driven sprocket 94. Here, as shown in FIG. 10B, the tongues 91 of the drive wheel 90 raises the fifth pawls 85 (expressed by a solid line) of the third carrier 80. As a result, the fifth pawls 85 are released from the fifth ratchet 54 of the second ring gear 50 and simultaneously the fourth pawls 84 (expressed by a dotted line) of the third carrier 80, which is not raised, is engaged with the fourth ratchet 72 of the ratchet wheel 70 by the elasticity of the pawl spring 87 (see FIG. 1). Thus, the drive wheel 90, the third carrier 80 and the ratchet wheel 70 integrally rotate in counterclockwise.

When the power applied from the drive wheel 90 in counterclockwise reaches the ratchet wheel 70 without chance in direction thereof, the ratchet wheel 70 transmits the power to the small gears of the two-stepped planetary gears of the second carrier 60. Here, the two-stepped planetary gears 63 change the rotation direction of the power into the clockwise while rotating centering their own shaft, so that the power is transmitted to the second ring gear 50 via the large gears of the two-stepped planetary gears 63. Thus, the rotation direction of the power applied to the drive wheel 90 in counterclockwise is changed into the clockwise via the ratchet wheel 70 and the second carrier 60, so that the second ring gear 50 rotates in clockwise. The process of transmitting the power to the transmission section I after the power is transmitted to the BDPA section II is the same as that when the power is applied from the drive wheel 90 in clockwise.

In the two-stepped planetary gears 63 used in the power changing apparatus according to the present invention, a ratio in diameter of each paired gear forming the two-stepped planetary gears 63 is controlled such that the power transmission speed from the second carrier 60 to the second ring gear 50 is to be constant. However, the ratio in diameters of the small and large gears of the two-stepped planetary gears 63 may be varied if required, to increase or reduce the rotation speed in the BDPA section II. Thus, the rotation speed can be controlled with various speeds in combination with the three-stage speed change in the transmission section I.

Third, the power transmission process of the power changing apparatus during the idling of the drive wheel 90 will be described with reference to FIG 10C.

The idling of the drive wheel 90 is possible only when the power is applied in counterclockwise, and the power is transmitted in the same manner above when the power is applied in clockwise.

As a precondition for the idling of the drive wheel 90, the pin 98 (see FIGS. 1 and 2) should be raised from the holes 92 formed at the circumference of the left side of the drive wheel 90 by pulling up the pin lever 4.

Figure 10C:
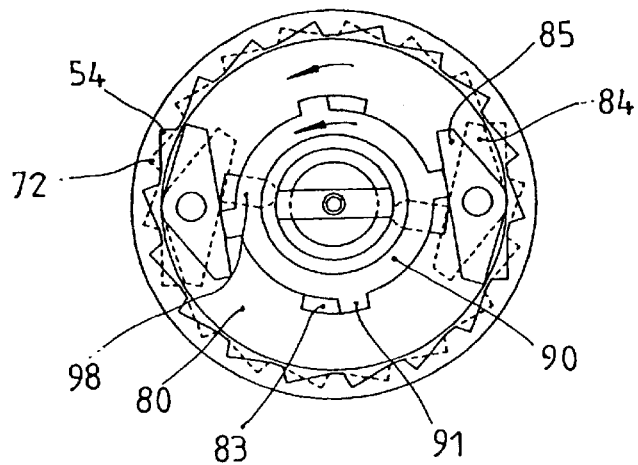

This state is shown in FIG. 10C. which is the same as FIG. 10B other than that the fourth pawls 84 are also raised by the pin 98. This state means that both fourth and fifth pawls 84 and 85 of the third carrier 80 are released from the fourth and fifth ratchets 72 and 54, respectively. Accordingly, the power of the drive wheel 90 cannot be transmitted to the BDPA section II, so that the drive wheel 90 idles.

In addition, as shown in FIG. 1, a ring 88 for holding the third carrier 80 is inserted between the third carrier 80 and the ratchet wheel 70 to prevent the rotation of the third carrier 80 when the drive wheel 90 rotates in counterclockwise.

Industrial Applicability

As described above, the power changing apparatus of a bicycle hub according to the present invention enables to freely change the direction and speed of the applied power by controlling levers.

The present apparatus has excellent compatibility to the parts of the conventional bicycle, so that the present apparatus can be attached to the conventional bicycle easily. Also, the present apparatus can drive the bicycle forward at all times regardless of the direction of power applied thereto and also allow an idling if required when pedaling rearward like the general bicycle. In addition, the speed of the applied power can be changed, into three stages. Here, the speed change into three stages or more is possible by partially exchanging the parts included in the apparatus.

When a rider drives a bicycle to which the present apparatus is attached, the rider's muscle in legs can be developed in balance and simultaneously energy applied to the pedals can be effectively utilized. Also, the present apparatus is a multipurpose attachment apparatus of a bicycle in which all parts of the present apparatus are included therein, providing high safety and convenience in handling. In addition, preciseness of the parts, and rotation efficiency, endurance and operational reliability are improved by increasing the preciseness of the parts.

What is claimed is:

1. A power changing apparatus of a bicycle hub including a transmission section carrying a plurality of planetary gears, comprising:

a hub shaft an input arrangement connected to provide power generated from a pair of pedals to a bi-directional pedaling apparatus utilizing a chain connected to a front sprocket fixed to a pedal shaft;

said bi-directional pedaling apparatus arranged for changing the direction of power applied from the input arrangement either in a clockwise or counterclockwise direction into the clockwise direction to transmit the direction-changed power to said transmission, and blocking the power applied from the input arrangement in the counterclockwise direction depending on predetermined conditions;

a connection arrangement mounted for receiving the power from the bi-directional pedaling apparatus and transmitting the received power to the transmission;

said transmission changing power applied from the connection arrangement and the bi-directional pedaling apparatus into multiple stages and transmitting the resultant power to a hub shell using planetary gears;

said hub shell installed around said hub shaft for protecting said transmission, said connection arrangement and said bi-directional pedaling arrangement as a housing and simultaneously driving a bicycle by receiving the power from said transmission, said hub shaft having one end connected to the transmission, another portion connection to the connection arrangement, and another end connected to the bi-directional pedaling apparatus.

2. A power changing apparatus as claimed in claim 1, wherein said hub shaft has a hollow cylindrical shape with multiple steps, and a screw-portion, a first spline, a first sun gear, a first pin hole, a second spline and a second pin hole and another screw-portion are formed from the left to the right of said hub therein.

3. A power changing apparatus as claimed in claim 1, wherein said transmission comprises:

a first sun gear integrally formed at a left portion of said hub shaft without being rotated;

a first carrier in a hollow cylindrical shape, having at least one or more openings at the outer circumference of the left side, in which the same number of first pawls as that of the openings are installed, at least one or more holes at the circumference, in which the same number of planetary gears as that of the holes are rotatably installed in the same direction as that of the hub shaft centering each shaft of the planetary gears, and third spline grooves at the inner portion of the right side, wherein the first pawls are engaged with a first ratchet of said hub shell, the inner side of the planetary gears are engaged with said first sun gear, and the third spline grooves are engaged with third splines of said connection arrangement; and a first ring gear in a hollow cylindrical shape, having a first gear at the inner wall of the left side, at least one or more holes in the circumference thereof in which second pawls are elastically installed by a spring, and a third ratchet at the inner wall of the right side, wherein the first gear is engaged with said hub shell and the inner side of the second pawls is engaged with said connection arrangement, and the third ratchet is engaged with third pawls of a second ring gear.

4. A power changing apparatus as claimed in claim 3, wherein the number of planetary gears of said first carrier is four.

5. A power changing apparatus as claimed in claim 3, wherein the second pawls of said first ring gear has a boomerang shape.

6. A power changing apparatus as claimed in claim 1, wherein said connection arrangement has a hollow cylindrical shape and is formed with a clutch having third splines having a plurality of slant tongues at an outer portion of the left side, two holes piercing the circumference thereof, and four protrusions at the outer potion of the right side, wherein the third splines are engaged with the third spline grooves of said first carrier and four protrusions are slidably connected to slots of a second ring gear.

7. A power changing apparatus as claimed in claim 6, wherein said transmission changes rotation speed while location of said clutch is controlled by a lever installed in said hub shaft.

8. A power changing apparatus as claimed in claim 1, wherein said bi-directional pedaling arrangement comprises:

a second ring gear having at least one or more openings at the circumference of the left side to which third pawls are inserted, at least one or more slots at the inner portion of the left side, a second gear at the inner wall of the middle portion and a fifth ratchet at the inner wall of the right side, wherein the third pawls are engaged with the third ratchet, the slots are slidably connected to the protrusions of said clutch, the second gear is engaged with a plurality of two-stepped planetary gears, and the fifth ratchet is engaged with fifth pawls;

a second carrier in a hollow cylindrical shape, having a nut hole at the circumference of the left side and second spline grooves at the inner portion of the left side, at least one or more holes at the circumference in which the two-stepped planetary gears are rotatably fixed by each corresponding planetary gear shaft, wherein said second carrier is connected to the second spline of said hub shaft and integrally connected to said hub shaft by inserting a bolt to the nut hole, small gears of the two-stepped planetary gears are engaged with a second sun gear and large gears thereof are engaged with the second gear;

a ratchet wheel in a hollow cylindrical shape with multiple steps, having a second sun gear at the left side and a fourth ratchet at the inner wall of the right side, wherein said ratchet wheel is rotatably fixed around said hub shaft such that the fourth ratchet is engaged with fourth pawls of a third carrier; and a third carrier in a hollow cylindrical shape, having two grooves at the circumference in which fourth and fifth pawls are rotatably coupled by a pawl shaft, and at least one or more grooves at the inner wall, wherein the fourth pawls are engaged with the fourth ratchet, the fifth pawls are engaged with the fifth ratchet and the grooves formed at the inner wall are put over each tongue of a drive wheel.

9. A power changing apparatus as claimed in claim 1, wherein said input arrangements is a hollow cylindrical shape formed of a drive wheel having the same number of tongues as that of the grooves formed at the inner wall of said third carrier at the outer portion of the left side, holes through which a pin passes at the circumference of the left side, and openings at the circumference of the right side to which a driven sprocket is tightly connected, wherein the tongues locate beneath the fourth pawls and the fifth pawls of said third carrier.

10. A power changing apparatus as claimed in claim 9, wherein a pin is inserted into said drive wheel to push up the fourth pawls.

11. A power changing apparatus as claimed in claim 10, wherein the pin is controlled upward and downward by a pin lever.

12. A power changing apparatus as claimed in claim 1, wherein said hub shell is a hollow cylindrical shape with multiple steps, and a first ratchet is formed at the inner wall of the left side and a second ratchet is formed at the middle portion, and wherein the first ratchet is engaged with the first pawls and the second ratchet is engaged with the second pawls.

* * * * *